(No Model.)

J. R. WHITE.
COTTON PLANTER.

No. 380,841.            Patented Apr. 10, 1888.

WITNESSES:
Phil C. Dietrich
C. Sedgwick

INVENTOR:
J. R. White
BY Munn & Co.
ATTORNEYS.

UNITED STATES PATENT OFFICE.

JACOB R. WHITE, OF GREENVILLE, ALABAMA.

COTTON-PLANTER.

SPECIFICATION forming part of Letters Patent No. 380,841, dated April 10, 1888.

Application filed November 10, 1887. Serial No. 254,737. (No model.)

*To all whom it may concern:*

Be it known that I, JACOB RAWLINGS WHITE, of Greenville, in the county of Butler and State of Alabama, have invented a new and Improved Cotton-Planter, of which the following is a full, clear, and exact description.

My invention relates to a machine intended more particularly to plant cotton-seed, but adapted also for planting other seeds in rows or drills; and the invention has for its object to provide a simple, inexpensive, and efficient machine of this character, by which the soil may be opened, the seed dropped regularly therein, and then covered, and all by one passage of the machine over the field.

The invention consists in certain novel features of construction and combinations of parts of the seed-planter, all as hereinafter described and claimed.

Reference is to be had to the accompanying drawings, forming a part of this specification, in which similar letters of reference indicate corresponding parts in all the figures.

Figure 1:
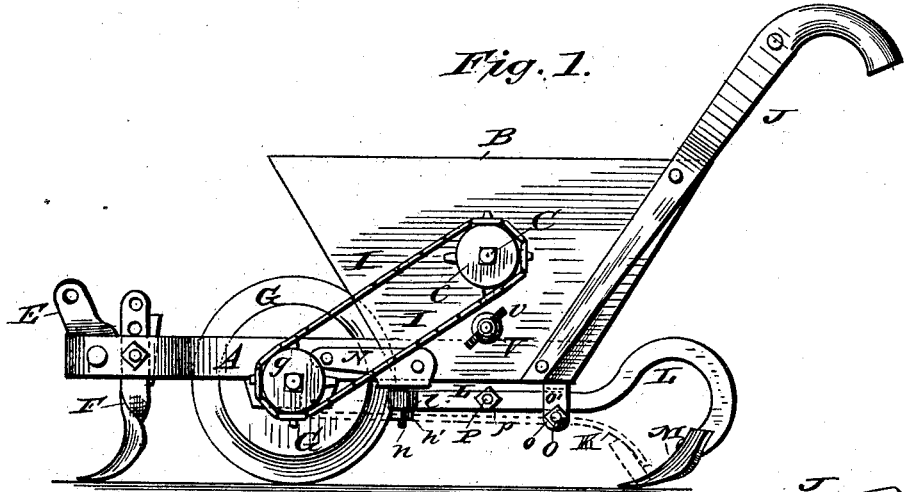
Figure 2:
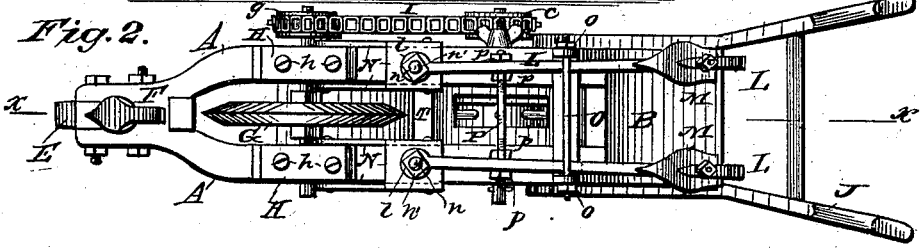
Figures 3, 5:
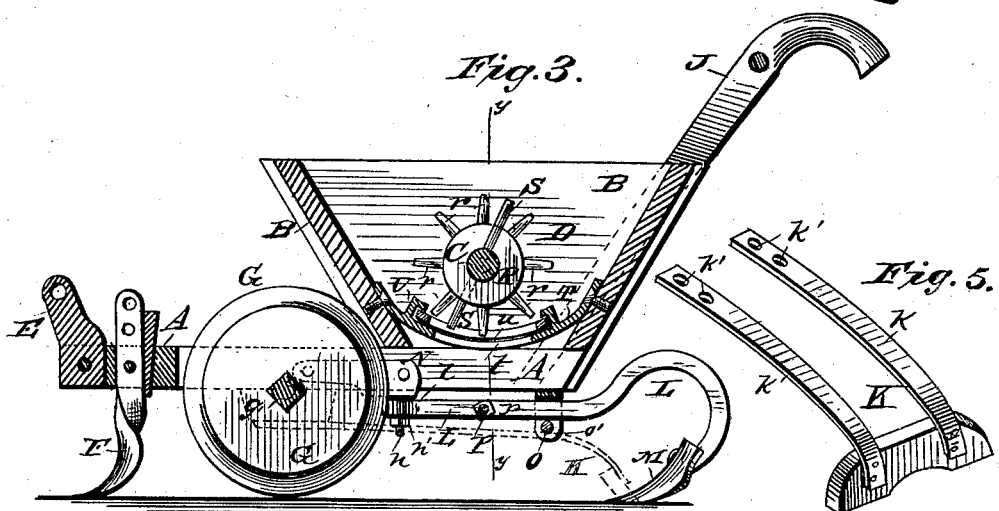
Figure 4:
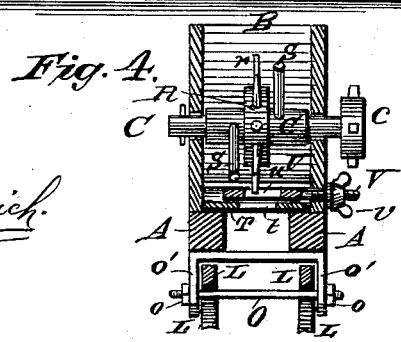

Figure 1 is a side elevation of my improved cotton-planter, with a board coverer indicated in dotted lines. Fig. 2 is an under side view of the planter. Fig. 3 is a longitudinal sectional elevation taken on the line x x of Fig. 2. Fig. 4 is a vertical transverse section taken on the line y y, Fig. 3; and Fig. 5 is a perspective view of the board seed-coverer of the machine.

The frame A of the planter is composed of two parallel beams, which are connected together at the front, and at their rear ends are braced to each other by the seed-hopper B, which is thus supported on the frame. A transversely-ranging shaft, C, is journaled in the hopper and carries the rotating cotton-seed agitator D, hereinafter more particularly described. At its forward end the frame A is fitted with a suitable draft iron or clevis, E, and is provided behind the clevis with a furrow-opening plow, F, which may be adjusted to work at any required depth in the soil.

Between the furrow-opener and the hopper a disk wheel or colter, G, is journaled by its shaft g' in suitable boxes, H, fixed to the frame A, said disk-colter serving by its angular periphery to smooth the sides of the furrow made by the plow F, and the colter by its action in the earth is also caused to operate the agitator D in the hopper B by means of a belt, I, which runs from a pulley, g, on the colter-shaft to a pulley, c, on the agitator-shaft, and whereby the agitator is rotated in the hopper by the advance of the machine, which is guided by an attendant holding the handles J, fixed to the hopper and frame.

If desired, the ordinary board coverer, K, (shown in Fig. 5,) may be used to cover the seed dropped from the hopper, and this coverer will be held by the bolts h of the colter-shaft boxes H, which will be passed through holes k' at the forward ends of the elastic arms k of the coverer to hold the coverer to its work and in the position shown in dotted lines in Figs. 1 and 3 of the drawings; but usually the plow-coverers shown in full lines in the drawings will be employed. These plow-coverers consist of two beams, L L, to each of which an ordinary covering-plow, M, is bolted. The forward end of each beam L is provided with a vertically-ranging eye, l, which fits onto a bolt end, n, which is fast to the bottom of a metal yoke-plate, N, the two side parts or ears of which lap onto opposite side faces of the side beam of the planter-frame A and are bolted to the frame-beam at their front and rear ends. Nuts n' on the bolt ends n, below the covering-plow-beam eyes l, hold said plow-beams in place, one to each side beam of the frame. The beams L L have support near their rear bent ends on a rod, O, which is held by nuts o o to metal lugs o' o' on a plate fixed to the frame A, and at about midway between the rod O and their eyes l the two coverer-beams L L are pierced by a rod, P, which is screw-threaded at opposite ends, and is provided with two pairs of nuts, p p, one nut at each side of each coverer-beam, and which allows these beams to be adjusted laterally in or out at their back ends to set the two covering-plows M M, which they carry, at any desired distance apart to assure proper covering of seed dropped in any kind of soil.

The agitator D is provided at the center of its shaft C with a disk plate or hub, R, which is considerably larger in diameter than the shaft, and is provided at its periphery with a series of radial pins or spokes, r, forming beaters, and in the shaft are fixed, one at each side of the hub R, radial pins S S, which also form beaters, and with the pins r serve to thoroughly mix or agitate the seed in the hopper B to cause it to loosen and drop evenly or regularly to the ground through the opening or slot t in the metal bottom plate, T, of the hopper; and in order to regulate the dropping of the seed a gage-plate, U, which is provided with a slot, u, is fitted to slide laterally of the hopper in cleats or guides held to the bottom plate of the hopper, and the gage-plate is provided with a bolt end or screw, V, which projects through the side of the hopper and is fitted with a screw, v, outside of the hopper, thus allowing the gage-plate U to be adjusted by turning said screw to cause its slot u to coincide more or less fully with the slot t of the hopper bottom to control the rapidity of escape of seed from the hopper as the nature of the seed or condition of the soil may require, and as will readily be understood.

Having thus described my invention, what I claim as new, and desire to secure by Letters Patent, is—

In a seed-planter, the combination, with the frame and a yoke-plate, N, secured to the frame and provided with the pivot n, of the plow-beams L, provided with the eyes l and adjustably connected together by the rod P and nuts p, the downwardly-projecting and apertured lugs o, secured to the frame, and the rod O, secured in the lugs o and supporting the plow-beams, substantially as herein shown and described.

J. R. WHITE.

Witnesses:
   J. H. BERGANIER,
   J. H. STERNER.